Patented Sept. 12, 1950

2,521,937

UNITED STATES PATENT OFFICE 2,521,937

METHOD OF PURIFYING INERT GASES

Amos S. Newton, Ames, Iowa, assignor to the United States of America as represented by the United States Atomic Energy Commission No Drawing. Application May 18, 1945, Serial No. 594,586

4 Claims. (Cl. 23—14.5)

The present invention relates to an improved method of purifying the inert gases, helium, neon, argon, krypton, xenon and radon of group O in the periodic table.

Due to the fact that the inert gases are substantially nonreactive, chemically, the problem of purifying those gases is one of unusual complexity and is one which has presented great difficulties to the art for a long period of time. Certain procedures have been evolved which are capable of eliminating some types of gaseous impurities from the inert gases, but, in general, it has been found necessary to utilize a plurality of successive treatment procedures in order to accomplish complete and satisfactory purification.

The present invention is concerned with the provision of an improved method of purifying the inert gases, and more particularly with the provision of an improved, single-step method for accomplishing such purification.

Essentially, the process of the present invention is based upon the discovery that all known reactive gases can be separated from inert gas or a mixture of inert gases by passing the impure gas over metallic uranium, which is preferably in particle form and which is heated at an elevated temperature. In general different impurities may be removed at different temperatures and frequently it is desirable to conduct the heating so as to provide two temperature zones, one having a temperature range of from about 500 to 1000° C., and the other having a range of the order of about 200 to 250° C. In one exemplary set-up for practicing the invention, the uranium metal, which is preferably in particle or powdered form, is contained within a quartz combustion tube, or other suitable elongated container, which is heated at one end to about 800 to 1000° C., and which at the opposite end is maintained at a temperature varying from 200–250° C. to 30–35° C. The tube is preferably substantially filled with the metal particles. This arrangement provides temperature zones of the required ranges within the tube, and the gas to be purified is passed through the tube at a uniform rate of flow from the hotter end to the colder end. The uranium in the high temperature zone reacts with any reactive impurities which may be contained in the inert gas to be purified, including nonmetal-hydrogen compounds such as $NH_3$, $H_2S$, $H_2O$, $PH_3$, $C_2H_4$, or other impurities such as, $H_2$, $O_2$, $Cl_2$, $COCl_2$, $CO_2$, $CO$, $N_2$, $NO$, $SO_2$, etc., to form stable compounds having low vapor pressures. In reacting with any impurities which contain hydrogen, however, the hydrogen is given off as $H_2$, but uranium has the peculiar property that when it is heated to a temperature of the order of 200 to 250° C.—the temperature maintained in the cooler zone—it reacts with hydrogen to form the uranium hydride $UH_3$, which is likewise a stable compound having a low vapor pressure at ordinary temperatures.

Thus, it will be apparent that the two temperature zones provided in the combustion tube or other container for the uranium metal create reactive conditions which effect in the higher temperature zone the elimination of gaseous impurities except hydrogen, and, in the cooler zone, effect the elimination of any hydrogen which may exist as an initial impurity or which may be formed in the hotter of the reactive zones. The method, while simple and relatively easy to carry out, is highly effective and has been found capable of producing inert gases of a purity heretofore believed almost impossible of attainment. Furthermore, since the vapor pressure of the reaction products formed in the two reactive zones is relatively low, the process is suitable for use in connection with procedures requiring low gaseous pressures.

The uranium metal used in the process of the invention should be as high a degree of purity as is possible. The size of the uranium particles has substantial effect upon the process, and, in general, the smaller the particles, the better the results. Very satisfactory results have been obtained by the use of bright surfaced, thin turnings, which have been cleaned in a 1–1 aqueous solution of nitric acid ($HNO_3$). Powdered metal also works well, but considerably more effective purification with increased possible rates of gas flow will result if the uranium metal is prepared by the thermal decomposition, in vacuo, of chemically pure uranium hydride, $UH_3$. Uranium hydride breaks down when heated to a temperature of the order of from 300 to 400° C. to yield a partially sintered, relatively porous body of uranium metal, and this form of the metal, as has been previously stated, has been found to be especially satisfactory in carrying out the process of the present invention. The improved results obtained by the use of the sintered metal resulting from the thermal decomposition of uranium hydride are believed to be due to the greatly increased surface area which results from the decomposition.

In the foregoing, there has been disclosed an improved method for effecting the continuous purification of rare gas or a mixture of such gases. The improved process of the invention requires the use of extremely simple apparatus which is relatively easily assembled and operated. At the same time, the process is effective to accomplish substantially complete elimination of any reactive gas from a mixture of such gas and inert gas or gases. The improved process of the invention has proven highly useful in actual practice, and satisfies a long existing need in the art.

What is claimed is:

1. A method of purifying an inert gas which contains a hydrogen-nonmetal compound comprising heating the gas with uranium at a temperature sufficiently high to form a compound of uranium and the nonmetal and further heating the gas with uranium at a lower temperature to form uranium hydride.

2. A method of purifying an inert gas which contains hydrogen sulfide comprising heating the hydrogen sulfide-containing gas with uranium at a temperature sufficiently high to form a compound of uranium and sulfur and further heating the residual gas with uranium at a lower temperature to form uranium hydride.

3. A method of purifying an inert gas which contains phosphine comprising heating the phosphine-containing gas with uranium at a temperature sufficiently high to form a compound of uranium and phosphorus and further heating the residual gas with uranium at a lower temperature to form uranium hydride.

4. A method of purifying an inert gas which contains gaseous hydrocarbons comprising heating the gaseous hydrocarbon-containing gas with uranium at a temperature sufficiently high to form a compound of uranium and carbon and further heating the residual gas with uranium at a lower temperature to form uranium hydride.

AMOS S. NEWTON.

REFERENCES CITED

The following references are of record in the file of this patent:

UNITED STATES PATENTS

| Number | Name | Date |
|---|---|---|
| 1,658,631 | Dannenbaum | Feb. 7, 1928 |
| 1,816,830 | Driggs | Aug. 4, 1931 |
| 1,835,024 | Driggs | Dec. 8, 1931 |

OTHER REFERENCES

"Inorganic and Theoretical Chemistry," by Mellor, v. 12, pages 30–31.